Aug. 6, 1946.  R. L. HIBBARD  2,405,141
CONVEYER TABLE
Filed Dec. 23, 1943  6 Sheets-Sheet 1

INVENTOR.
Robert L. Hibbard,
BY Edward A. Laurence
his attorney

Aug. 6, 1946.      R. L. HIBBARD      2,405,141
CONVEYER TABLE
Filed Dec. 23, 1943      6 Sheets-Sheet 4

INVENTOR.
Robert L. Hibbard.
BY Edward A. Lawrence
his attorney

Patented Aug. 6, 1946

2,405,141

UNITED STATES PATENT OFFICE 2,405,141

CONVEYER TABLE

Robert L. Hibbard, Bellevue, Pa., assignor of one-half to William K. Stamets, Mars, Pa.; Stewart C. Hibbard, Robert L. Hibbard, Jr., and Hays M. Junkin, executors of said Robert L. Hibbard, deceased Application December 23, 1943, Serial No. 515,409

13 Claims. (Cl. 10—107)

1

This invention relates generally to work holders and more particularly to conveyer tables arranged to select, position and clamp an elongated work piece while operated upon by a machine tool and automatically remove the work piece when finished and replace it with another work piece.

This conveyer table may be conveniently applied to a rod or pipe threading machine wherein the work pieces are loaded on a storage rack and automatically fed by the conveyer table mechanism to a machine tool which threads one end of the pipe, then deposits it on a second conveyer table which delivers the other end of the pipe to a second threading machine tool and when finished the second conveyer table deposits the pipe on a storage rack for removal.

The principal object of this invention is the provision of a conveyer table which automatically selects an elongated work piece, positions and clamps the work piece for operation by a machine tool and ejects the finished work piece replacing it with another.

Another object is the provision of a conveyer table for locating a work piece before it is placed into the position where it is worked upon.

Another object is the provision of a conveyer table arranged to move an elongated work piece transversely and longitudinally for the purpose of selecting a work piece, positioning and holding it during the machining operation and ejecting it after the machining operation has been completed.

Another object is the provision of a conveyer table for intermittently transferring an elongated work piece transversely through a series of successive positions.

Another object is the provision of a conveyer table which locates the longitudinal position of a work piece and shifts it laterally and longitudinally into position for machining and ejects the work piece after the machining operation has been completed.

Another object is the provision of a conveyer table mechanism having a plurality of levers which raise a number of work pieces simultaneously and permit them to roll to the free end of the levers and successively pass from one position to another.

Another object is the provision of an automatic conveyer table mechanism arranged to intermittently transfer a series of work pieces through a cycle of successive stations and at least one machine tool located at a station for operating on the work piece. One of the functions of the machine tool initiates the operating cycle of the conveyer table to eject the finished work piece and insert another for machining.

Another object is the provision of a conveyer table and machine tool arranged to be operated in synchronism wherein a period in the cycle of one initiates the operating cycle of the other.

Other objects and advantages appear in the following description and claims.

Two practical embodiments illustrating the principles of this invention are shown in the accompanying drawings wherein.

Figure 1:
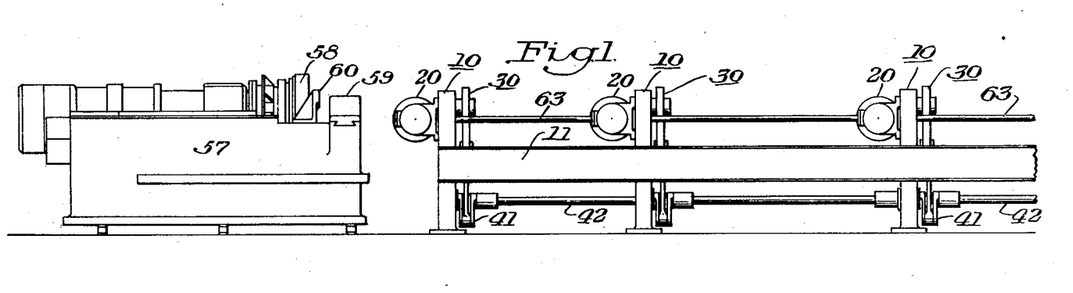
Figs. 1 and 1A are side elevations of two conveyer tables comprising this invention.
Figure 1A:
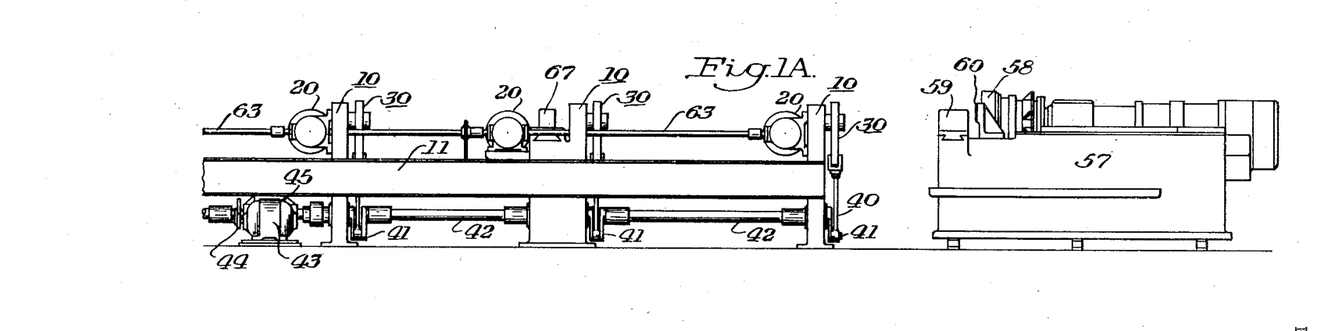
Figure 2:
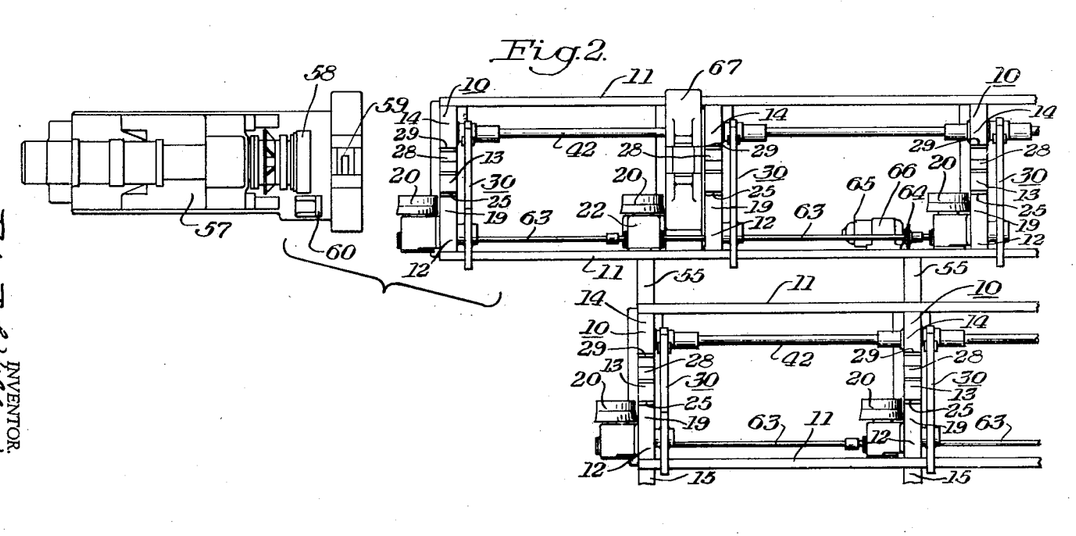
Figs. 2 and 2A are plan views of the conveyer table shown in Figs. 1 and 1A.
Figure 2A:
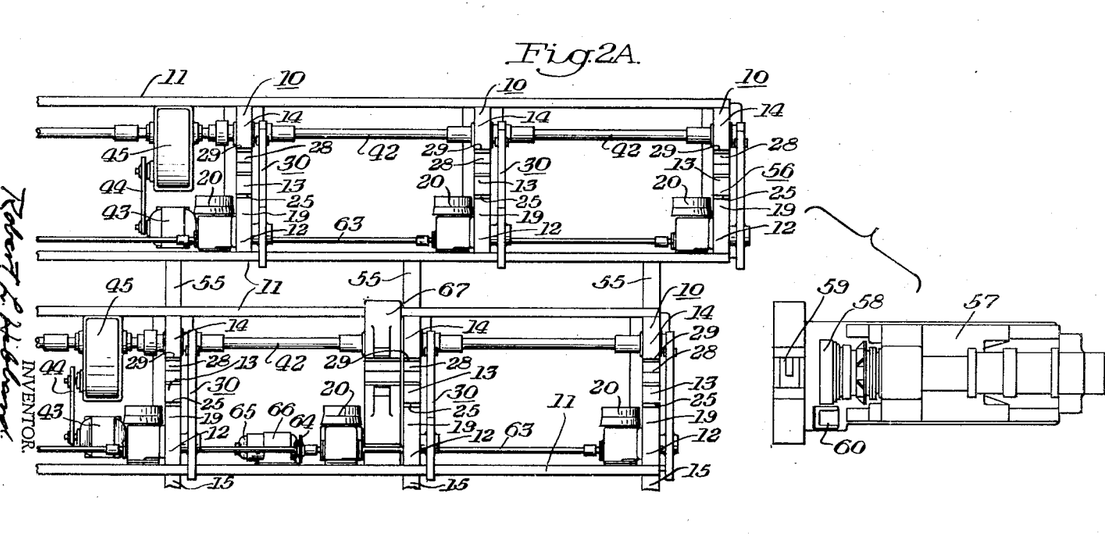
Figure 3:
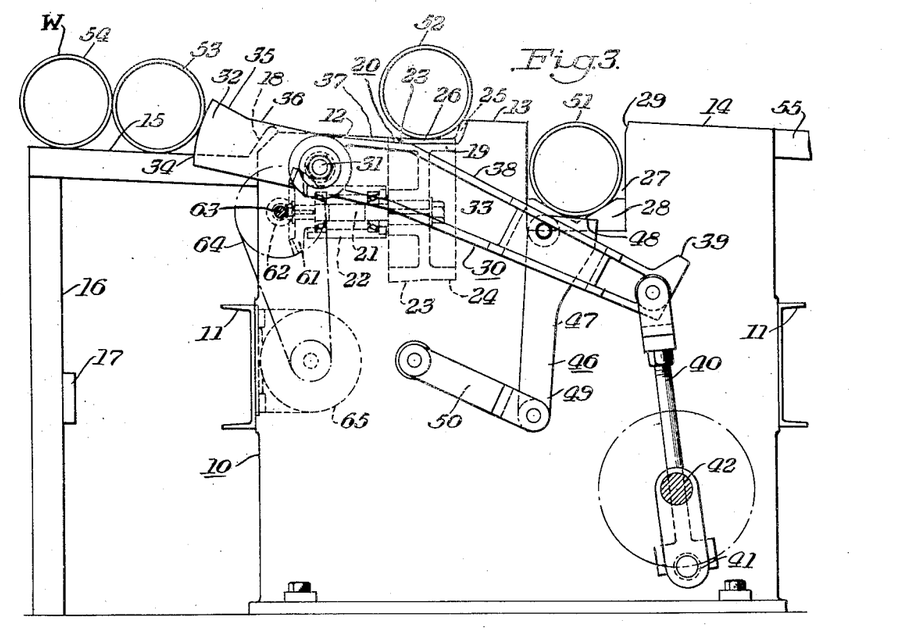
Fig. 3 is an end view of the conveyer tables shown in Figs. 1 and 2 with the work pieces at rest.

Referring principally to Figs. 1 to 3 of the drawings two conveyer tables are shown in conjunction with a threading machine at one end of each conveyer table. Each conveyer table is made up of a series of transversely disposed and matched frames 10, the first table having five frames and the second six. These frames are mounted in spaced relation and are bolted together at the front and rear by means of the channels 11 which are secured half way up the ends of the frames. The top of each frame has a general slope from the front to the rear of the table and forms a skid surface divided into three steps 12, 13 and 14. The first skid step 12 is higher than the storage skids 15 which also slope toward the table and are independently carried by the supporting posts 16. The posts 16 are braced by the tie members 17 forming a rigid storage rack capable of carrying a number of elongated work pieces W, which in this instance are pipes. A stop 18 is secured to each storage skid to arrest the movement of the pipe before it is lifted to the first skid step 12 of the frames forming the table.

The first skid step 12 of each frame is cut away at 19 to permit the pipe to be received by the rollers 20 which are mounted on the shafts 21 rotatably mounted in the gear housings 22 secured to the left side of each frame 10. One half of the perimetral surface 23 of the rolls 20 adjacent the front of the frames 10 is frusto conical, being provided with the same slope as the first skid surface 12, and the other half 24 is cylindrical. A stop 25 is secured to the side of each frame adjacent the front of the second skid step 13 and is arranged for adjustment to engage the cylindrical work piece or pipe so that it rests in the seat 26 formed in the center of the rolls 20 at the juncture of the frusto conical and cylindrical surfaces 23 and 24.

The second step 13 is relatively short and a deep seat 27 is located between the second and third skid steps 13 and 14. A V-block 28 is positioned in the bottom of the seat 27 to receive and center the pipe relative to the machine tool which is arranged to preform work on the pipe while in this position.

The last skid step 14 on top of the frames 10 provides sloping surfaces for rolling the pipe off the conveyer table. The top corner of the deep seat 27 adjacent to the skid step 14 is beveled as indicated at 29 to avoid any interference when the pipe is lifted out of the seat 27 onto the third skid step 14 and to provide a stop for the next succeeding pipe. Each of the three skid steps 12, 13 and 14 slope downwardly to the rear of the table at an angle of approximately three degrees from the horizontal.

The highest point of the third skid step 14, which is adjacent the deep seat 27, is approximately at the same elevation as the lowest portion of the second skid step 13 but is higher than the highest portion of the first skid step 12, and all of the skid steps are higher in elevation than the storage rack skid 15. Thus the pipe must be raised from each seat or position to permit it to roll to the next succeeding position and an oscillating lever 30 is pivotally supported adjacent to each frame for this purpose. These levers are each pivotally supported on a stub shaft 31 that is secured to its respective frame. The stub shafts 31 are secured sufficiently below the first skid surface 12 to permit a portion of the upper surface of the levers 30 to be flush with the skid surfaces 12 during one position of the oscillating movement of the levers.

Each lever 30 has a relatively short heel section 32, which extends beyond the front of the frame, and a long section 33 which extends in the opposite direction beyond the deep seat 27 toward the rear of the frames. The heel section 32 has an arcuate end edge surface 34, which surface is concentric with the axis of the stub shaft 31, and two top skid surfaces 35 and 36, the former skid surface being substantially the same pitch as the storage skid 15 when the heel 32 of the lever is lowered until the surface 35 is flush with the skid 15. When the lever is in this position the surface 36 inclines upwardly to a point above the stub shaft 31, then extends further at a steeper angle as shown at 37 to a point opposite the roller 20 where the surface 38 again slopes downwardly at the same angle as the surface 35 to the upturned toe stop 39 at the end of the long section 33 of the lever 30. The toe stop 39 is opposite to the central portion of the third step 14. The latter skid surface 38 of the lever thus extends on both sides of the two seats 26 and 27. A connecting or crank rod 40 is pivotally attached to the long section 33 of the lever 30 adjacent the toe stop 39. The other end of the crank rod is journaled on the crank pin 41 of the crank shaft 42. The crank shaft 42 is journaled in each of the frames 10 and is driven by the motor 43 through the belt connection 44 and a gear mechanism housed in the box 45. The motor 43 is arranged to drive the crank shaft 42 through one revolution and stop a sufficient length of time to permit the machine to perform its function on the pipe while in the deep seat 27. Thus each of the levers 30 is raised and lowered in unison when the motor 43 is energized to rotate the crank shaft 42 through one revolution.

The pipe is lifted from the deep seat 27 by means of the compound lever arrangement 46 adjacent each frame 10 which consists of the vertical lever 47 pivotally secured adjacent its upper end to the long section 33 of the lever 30. The vertical lever is provided with a substantially horizontal surface 48 arranged to engage the under side of the pipe when the lever 30 is below the top of the frames 10. The vertical lever 47 has a depending tongue 49 pivotally secured to one end of the horizontal link 50, the other end of which is pivoted to the frame 10. Thus the vertically disposed lever 47 engages and lifts the pipe out of the deep seat 27 preventing the pipe from engaging the walls of the latter, which action would create an increased frictional load. This compound lever arrangement represents an important improvement in this invention.

The operation of the levers 30 through one revolution of the crank shaft 42 is shown by the relative positions of these members in Figs. 3 to 8 inclusive. In Fig. 3 the crank shaft 42 is at rest and the crank rods 40 are at their lowest position relative to the levers 30. In this position the pipe 51 is on the V-block 28 in the deep seat 27, the pipe 52 is resting in the seat 26 on the rolls and against the stop 25 while the pipe 53 is on the storage skid 15 and is arrested by the arcuate end edge 34 of the lever 30 and the pipe 54 is resting against the pipe 53.

Figures 4, 5, 6, 8:
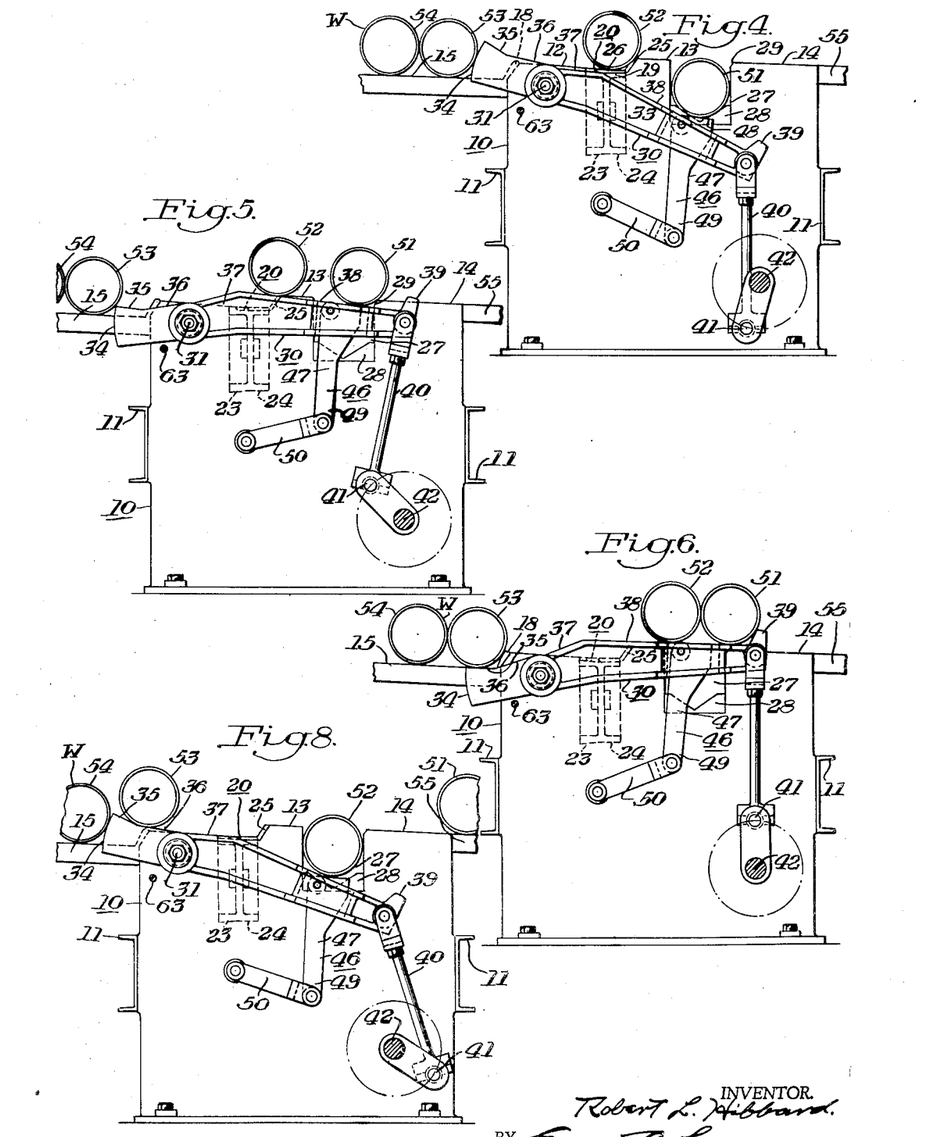
Figs. 4 to 8 are sectional views showing the different relative positions of the elongated work pieces traveling through the conveyer table.

The crank shaft 42 rotates in a clockwise direction in these views and as the connecting rods raise the levers 30 the top surface 48 of the vertical lever 47 engages the under side of the pipe 51 in the deep seat 27, as shown in Fig. 4. It will be noted that this engagement is during the slowest motion of the lever due to the simple harmonic motion of the crank shaft and the crank rod.

As the lever 30 is moved upwardly the pipe 51 is raised vertically until the link 50 prevents the lever 47 from having little effect in the control of the movement of the pipe and the top surface 38 of the lever 30 assumes the load as shown in Fig. 5. In the meantime the surface 38 of the lever 30 has engaged and raised the pipe 52 from the seat 26 and this pipe is now about to pass over the stop 25 onto the skid step 13. The tip of the heel 32 of the lever 30, which is formed by the surfaces 34 and 35, is well under the pipe 53 on the storage skids 15. The weight of the pipe 53 is effective in counterbalancing a portion of the load of the two pipes 51 and 52, supported by the surface 38 of the lever 30.

In Fig. 6 the lever 30 is at its uppermost position and the pipe 51 has been raised over the beveled stop 29, the pipe 52 has been raised over the stop 25 and both pipes have rolled together with the pipe 51 being stopped against the toe 39 which positions the pipe 52 over the deep seat 27. At this time the tip of the heel of the lever 30 has dropped below the surface of the skids 15 to permit the pipe 53 to roll against the stop 18 but cradled in the seat formed by the surfaces 35 and 36 of the lever 30. The crank shaft has thus turned through 180° and the lever 30 is in its highest position.

Further movement of the crank shaft lowers the lever 30 and the load of the pipe 51 is immediately deposited on the third skid step 14 of the frames while the pipe 52 is held by the beveled stop 29 and the pipe 53 is raised by the surface 35 of the heel 32 of the lever with the tip of the heel making a selection between the pipes 53 and 54.

Figure 7:
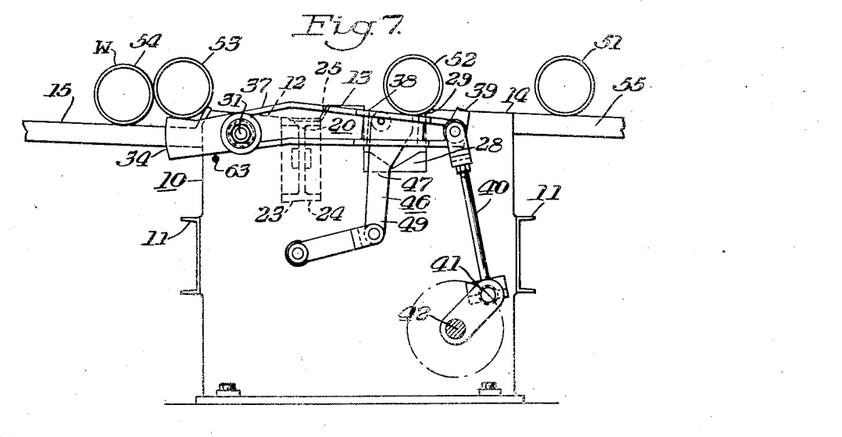

Further downward movement of the lever is shown in Fig. 7 wherein the top surface 48 of the lever 47 is supporting the pipe 52 while it is being lowered onto the V-block 28 in the deep seat 27 and the heel 32 of the lever is about to raise the pipe 53 over the stop 18 which would permit it to roll down the first skid step 12 and the surfaces 36 and 37 of the top of the lever 30. It will be noted that in this position the surface 37 of the lever 30 matches the first skid surface 12 of the frame 10. The pipe 53 then rolls down these surfaces onto the seat 26 on the rolls 20, being arrested by the stops 25 of each frame.

The pipe 51 being released by the toe stop 39 of the lever 30 dropping below the top of the frames 10, rolls down the third skid step 14 onto the storage skids 55 which may represent a storage rack for receiving pipe before its removal from the vicinity of the machine or a storage rack for the adjacent conveyer table 56, as shown in Figs. 1, 2 and 3, which is a duplicate of the conveyer table just described. When the machine tool 57 is provided with a threading die 58 for cutting a thread on the end of the pipe it is preferable to employ two conveyer tables placed side by side, as shown in Fig. 2, and two threading machine tools 57, one at one end of the first table and the other at the other end of the second table.

The machine tools 57 each have a reciprocating spindle which carries the threading die 58 and are provided with an upwardly open vise 59 having contracting jaws that may be used to guide the pipe during the threading operation or these jaws may be equipped with grips which engage and hold the pipe during the machining operation. The machine tool 57 is the subject matter of patent application Serial No. 515,408 filed December 23, 1943.

It is important that the pipe be moved longitudinally to a given position and held in place before the spindle shifts the threading die into cutting position as threading dies automatically collapse at the end of each threading operation which determines the length of the threaded portion on the pipe. To accomplish this purpose each machine tool 57 is provided with a mechanical stop 60 which is supported on the base of the machine tool 57 in axial alignment with the pipe when resting in the seat 26 on the rollers 20. The stop 60 may be constructed to prevent the mechanical shock created by the impact of the pipe from being transmitted to the mechanism.

The rollers 20 move the pipe longitudinally until the end strikes the stop 60 in the proper position relative to the machine tool, which position is maintained while the pipe is transferred from the seat 26 to the V-blocks in the deep seats 27. As previously stated, each roller 20 is mounted on one end of a horizontal shaft 21 journaled in the gearbox 22. A beveled gear 61 is secured to the other end of each shaft 21 and meshes with a beveled gear 62 on the shaft 63 that extends through and is journaled in each of the frames 10. The shaft 63 is provided with a driving connection 64, such as a belt and pulley, which receives rotary power from the motor 65 through the friction clutch 66. The motor and the clutch are mounted as a unit on the inside of one of the channel members 11.

The motor 65 is arranged to run continuously when the conveyer table is in operation and the rolls 20 on the first conveyer table rotate in a clockwise direction in Fig. 1 to move the pipe W to the right until it strikes the stop 60. The stop 60 prevents further longitudinal movement of the pipe and the weight of the pipe thus held produces a sufficient frictional load on the rolls 20 to stop their rotation by causing the clutch 66 to slip. The clutch 66 may be adjusted to slip when the proper frictional load is applied on the rolls 20. When the levers 30 are operated to remove the pipe from the seat 26 on the rolls 20 to the deep seat 27, the rolls being released from their frictional engagement with the pipe are again set in motion to move the next section of pipe to the right until its movement is arrested by the stop 60, causing the clutch 66 to again slip. When the pipe is raised from the seat 26 on the nonrotating rolls 20, to be shifted to the next succeeding seat 27 by the levers 30, it will not change its longitudinal position set by the stop 60. These features represent important advantages of this invention because the pipe is properly positioned longitudinally relative to the threading die 58 or other tool before it is in axial alignment with the tool and the rolls 20 are in motion when they receive the next section of pipe.

A vise 67 is also positioned within the conveyer table intermediate of the pipe length as it rests in the deep seat 27, as shown in Figs. 1 and 2. The jaws of the vise 67 are provided with grips that grasp the pipe and prevent it from turning during the machining operation. When a vise 67 is employed within the conveyer table the vise 59 on the base of the machine tool 57 is ordinarily used to guide but does not grip the pipe and if grips are employed in the vise 59 the vise 67 may be eliminated. The vises 59 and 67 are similar in construction and may be operated by a fluid actuated servomotor controlled by an electrically operated solenoid valve, not shown. The jaws of the vises 59 and 67 are each arranged to close a switch in their retracted position, which switches are in series with the circuit of the motor 43 to prevent the levers 30 from functioning before the vise jaws are fully open or retracted.

The machine tools 57 are set to operate in a complete cycle, that is the spindle carrying the threading die 58 is provided with a forward feed to properly cut the thread on the end of the pipe clamped in the deep seat 27. When the thread cut is finished the die 58 automatically collapses, which action disconnects the forward feed and rapidly retracts the spindle and die until it is reset at the end of its retracted stroke. The resetting of the die energizes the rapid traverse motor to rapidly traverse the die forward to the cutting position. The movement of the spindle to the cutting position switches the drive from the rapid traverse to the forward feed and the die again starts to cut the thread on the next section of pipe. This cycle of operation of the machine tool may be totally independent of the transfer operation of the pipe on the conveyer table. In such instances the cycle of operation of the machine tool and the conveyer table are synchronized to produce rapid operation of the machine. However the vises 59 and 67 must be held in their locking positions until the die 58 is clear of the end of the pipe. The movement of the spindle and die 58 thus initiates the opening of the vises 59 and 67. When the jaws of these vises are fully opened an electrical series circuit through switches actuated by each jaw energizes the motor 43 to rotate the crank shaft through one complete revolution and stop, which function reenergizes the vises 59 and 67 to clamp the new section of pipe in the deep seat 27.

Thus one portion of the cycle of operation of the machine tool initiates the cycle of operation of the conveyer table but both machines independently complete their cycle and can be adjusted to do so in synchronism with one another to thread and eject the pipe sections as quickly as possible, which is an important object of this invention.

The second conveyer table and machine tool operate in the same manner as that just described for threading or otherwise machining the other end of the pipe but the operation of these two sets of machines need only be correlated with one another to prevent the accumulation of pipe sections on the intermediate storage skids 55.

Figure 9:
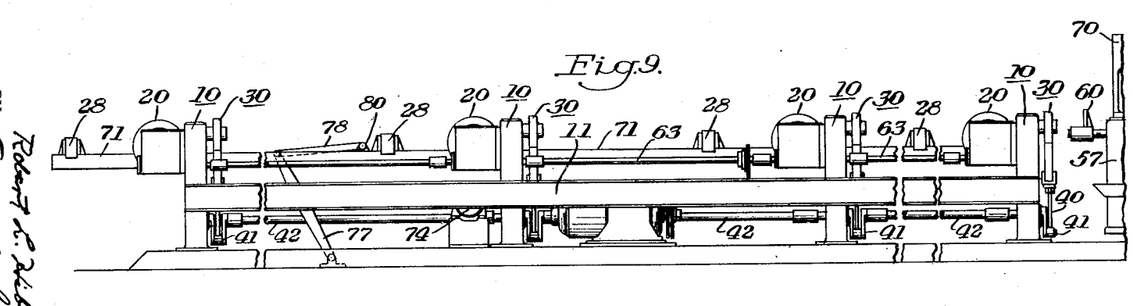
Fig. 9 is a side elevation of a conveyer table comprising this invention which is provided with an additional means for longitudinally moving the work piece to position the latter relative to the machine tool.
Figure 10:
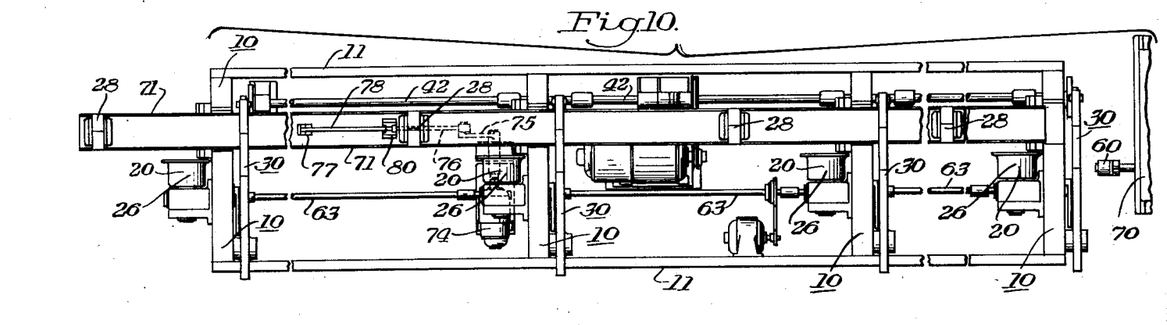
Fig. 10 is a plan view of the structure shown in Fig. 9.
Figure 11:
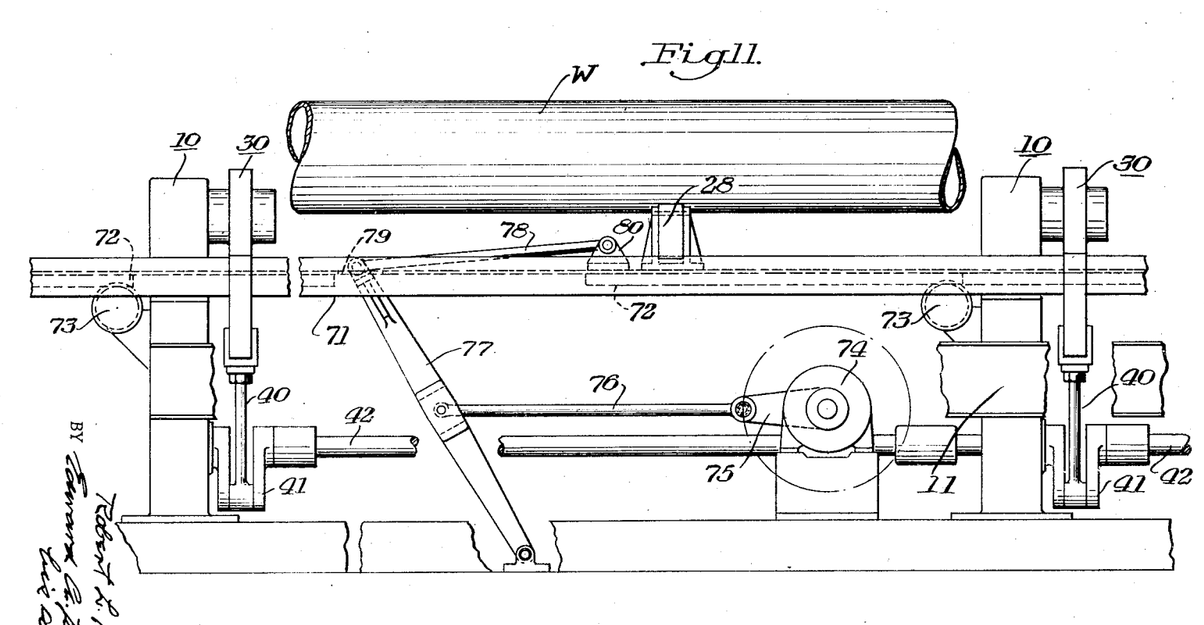
Fig. 11 is an enlarged view of the mechanism shown in Figs. 9 and 10 for moving the work piece longitudinally.

The conveyer table and machine tool structure shown in Figs. 9, 10 and 11 is similar to the structure previously described and like parts are designated with the same reference characters. However the structure of these views employs a different character of pipe clamping mechanism which necessitates a change in the structure supporting the pipe in the deep seat 27.

In this instance the pipe clamp or chuck 70 mounted on the machine tool 57 is not of the upwardly open jaw type but is closed and the pipe must be positioned axially of the clamp and inserted longitudinally into clamping position. The clamp 70 is a self-centering chuck of the character disclosed in United States Letters Patent 1,967,507.

The pipe is selected from the storage skids 15 and deposited on the seat 26 on the rolls 20 which move it longitudinally to the right until the end of the pipe strikes the stop 60, as previously described. The pipe is then shifted to the V-block 28 in the seat 27 by the levers 30 but the V-blocks 28 are supported on the longitudinally disposed H-beam 71 which is provided with under rail sections 72 that ride in the grooved rollers 73 carried by brackets supported on the side of the frames 10. The beam or carriage 71 is thus movable longitudinally through the deep seats 27 of the frames 10.

The V-blocks 28 are sufficiently high to support the pipe section far enough above the beam to permit the levers 30 to remain between the pipe and the beam during their non-operating position.

The beam 71 is reciprocated longitudinally between fixed limits by means of a crank and lever arrangement. A motor 74 is arranged to drive the crank 75 through 180° or in steps of one-half revolution. The wrist pin of the crank 75 has the pull rod 76 pivotally connected thereto. The other end of the pull rod is pivotally connected to the intermediate portion of the multiplying lever 77 the lower end of which is pivoted to a bracket fixed to the base of the machine and the upper end extends up through the slot 79 in the web of the beam 71 and is pivotally connected to one end of the pitman 78. The pitman is pivotally fastened to the bracket 80 secured to the top of the web of the beam 71. This crank and lever arrangement is located between two of the frames 10 and does not interfere with the other apparatus previously described.

When the crank 75 is rotated through 180° from the position shown in Figs. 9 and 10 the beam 71 moves forward toward the machine tool a definite distance determined by the length of the crank arm 75 and the lengths of the sections of the multiplying lever 77. Thus a pipe W, which is properly positioned relative to the machine tool in the seat 26 on the rolls 20, may be transferred to the V-blocks 28 on the beam 71 when in its retracted position and moved forward by the beam inserting the free end thereof through the self-centering chuck 70 and is clamped in position. The protruding end of the pipe is properly positioned relative to the threading die 58 or other machine tool since the beam 71 is reciprocated between fixed limits. In effect the pipe is accurately positioned three steps before it is actually worked upon.

After the pipe has been threaded and the die is withdrawn the chuck 70 is released and the motor 74 rotates the crank 75 through the last half of its revolution, thereby retracting the beam 71. The pipe is then ejected from the V-blocks 28 in the seat 27 and another section of pipe is inserted in position on the beam 71. It will be noted that the arrangement of the multiplying lever and the reach rod 76 are coupled with the crank 75 to provide the slowest movement of the simple harmonic motion to the beam 71 at the beginning and end of each stroke. Thus the pipe resting on the V-blocks is not subjected to a sudden jar and for this reason its weight is ordinarily sufficient to retain it in position on the V-blocks 28. Thus only the floating chuck is employed to clamp the pipe while it rests in the seat 27. A second conveyer table and machine tool of the same construction may be provided on either side of this machine to thread the other end of the pipe as described in regard to Figs. 1 and 2.

The control of the reciprocating movement of the beam 71 is initiated after the crank shaft 42 has completed one revolution and the levers 30 are at rest. At the end of the forward stroke of the beam 71 the clutch 70 is energized and clamps the pipe. This control is reversed in the opposite order and is initiated after the die clears the pipe end, as described before. When the beam is in its fully contracted position the motor 43 is again energized to rotate the crank shaft 42 through one complete revolution to transfer each pipe section to the next succeeding step.

I claim:

1. In a conveyer table, the combination of a plurality of frames mounted in parallel spaced relation to provide a work-supporting surface, a plurality of seats on each frame disposed in a series of successive locations along the upper surface thereof, the corresponding seats of the several frames being aligned to receive and support an elongated work piece, a plurality of levers pivotally supported adjacent one end and disposed parallel with the frames, at least one lever being arranged to operate between adjacent frames, means engaging the levers a substantial distance from their pivot ends for periodically oscillating said levers in unison to lift the work pieces out of the seats into position for shifting them toward the next consecutive location, a surface on the tops of the levers which slants downward toward their other ends when raised, and a second surface movable relative to the levers effective to engage and raise a work piece vertically until it is out of its seat to compensate for the slope of the slanting surface during the lower portion of the oscillation of the levers.

2. In a conveyer table, the combination of a plurality of frames mounted in parallel spaced relation to provide a work-supporting surface, a plurality of seats on each frame disposed in a series of successive locations along the upper surface thereof, the corresponding seats of the several frames being aligned to receive and support an elongated work piece, a plurality of levers pivotally supported adjacent one end and disposed parallel with the frames, at least one lever being arranged to operate between adjacent frames, means engaging the levers a substantial distance from their pivot ends for periodically oscillating said levers in unison to lift the work pieces out of the seats into position for shifting them toward the next consecutive location, a surface on the tops of the levers which slants downward toward their other ends when raised, a vertically disposed arm pivoted to each lever, means to maintain said arm substantially vertical as the lever oscillates, and a substantially horizontal surface on said arm being effective to engage and raise a work piece until it is out of its seat to compensate for the slope of the slanting surface during the lower portion of the oscillation of the levers.

3. In a conveyer table, the combination of a plurality of frames mounted in parallel spaced relation to provide a work-supporting surface, a plurality of seats on each frame disposed in a series of successive locations along the upper surface thereof, the corresponding seats of the several frames being aligned to receive and support an elongated work piece, a plurality of levers pivotally supported adjacent one end and disposed parallel with the frames, at least one lever being arranged to operate between adjacent frames, means engaging the levers a substantial distance from their pivot ends for periodically oscillating said levers in unison to lift the work pieces out of the seats into position for shifting them toward the next consecutive location, a surface on the tops of the levers which slants downward toward their other ends when raised, a vertically disposed arm pivoted to each lever, a horizontal link pivotally connected to the lower end of the arm and to a stationary member to maintain said arm substantially vertical as the lever oscillates, and a substantially horizontal surface on said arm being effective to engage and raise a work piece until it is out of its seat to compensate for the slope of the slanting surface during the lower portion of the oscillation of the levers.

4. In a conveyer table for prepositioning elongated work pieces prior to shifting them into the work performing position, the combination of a plurality of frames mounted in spaced relation to provide a work-supporting surface, each frame having a plurality of seats disposed in a series of successive locations along the upper surface thereof, the corresponding seats of the several frames being aligned to receive and support elongated work pieces, a roll disposed in the same location of each frame forming one seat for moving a work piece longitudinally, friction drive means for continuously applying power to rotate the roll in each frame in the same direction, a stop for arresting the longitudinal movement of the work piece in a predetermined position and to create sufficient friction on the rolls causing them to cease rotating while continuing to hold the work piece against the stop, and means to lift the work pieces reposing in the seats into position for shifting them to the next consecutive location and to permit the rolls to again rotate.

5. In a conveyer table, the combination of a plurality of frames mounted in parallel relation to provide a work-supporting surface, a roll disposed in the same location of each frame forming a seat to receive and support an elongated work piece, a common drive for rotating said rolls, a motor for operating the drive, a stop adjacent the end frame to arrest the longitudinal movement of the work piece in a predetermined position, friction clutch means operatively interposed between the motor and the drive arranged to slip when the frictional load of the work piece is increased by its engagement with the stop to cause the rolls to cease rotation, a series of V-blocks disposed in alignment in the same location of each frame forming a second seat to receive and support a work piece, means for clamping and machining the work piece while supported on the second seat, a plurality of levers pivotally supported parallel with the frames, at least one lever being arranged to operate between adjacent frames, and means for periodically oscillating said levers in unison to simultaneously remove the finished work piece from the second seat, transfer the work piece from the first seat to the second seat, and deposit another work piece on the rotating rolls of the first seat.

6. In a conveyer table, the combination of a plurality of frames mounted in parallel relation to provide a work-supporting surface, a roll disposed in the same location of each frame forming a seat to receive and support an elongated work piece, a common drive for rotating said rolls, a motor for operating the drive, a stop adjacent the end frame to arrest the longitudinal movement of the work piece in a predetermined position, friction clutch means operatively interposed between the motor and the drive arranged to slip when the frictional load of the work piece is increased by its engagement with the stop to cause the rolls to cease rotation, a series of rollers disposed in the same location of each frame, a beam movable longitudinally on said rollers, a plurality of V-blocks mounted on said beam forming a second seat to receive and support a work piece, means for clamping and machining the work piece while resting on the second seat, means for advancing the beam and work piece longitudinally a predetermined distance for machining and for retracting them when finished, and means for transversely shifting the work pieces simultaneously from the second seat, from the first seat to the second seat and depositing another work piece on the first seat.

7. In a conveyer table, the combination of a plurality of frames mounted in parallel relation to provide a work-supporting surface, a roll disposed in the same location of each frame forming a seat to receive and support an elongated work piece, a common drive for rotating said rolls, a motor for operating the drive, a stop adjacent the end frame to arrest the longitudinal movement of the work piece in a predetermined position, friction clutch means operatively interposed between the motor and the drive arranged to slip when the frictional load of the work piece is increased by its engagement with the stop to cause the rolls to cease rotation, a series of rollers disposed in the same location of each frame, a beam movable longitudinally on said rollers, a plurality of V-blocks mounted on said beam forming a second seat to receive and support a work piece, means for clamping and machining the work piece while resting on the second seat, means for advancing the beam and work piece longitudinally a predetermined distance for machining and for retracting them when finished, a plurality of levers pivotally supported parallel with the frames, at least one lever being arranged to operate between adjacent frames, and means for periodically oscillating said levers in unison to simultaneously remove the finished work piece from the second seat, transfer the work piece from the first to the second seat and deposit another work piece on the rotating rolls of the first seat.

8. A machine for supporting a work piece to be operated upon, comprising a base, a carriage slidable longitudinally on the base and arranged to carry a work piece in a fixed position, a rotary crank, and lever means connecting the crank and the carriage for advancing and retracting the carriage and the work piece longitudinally into and out of operating position, including a crank arm, and a multiplying lever coupled to the carriage and the crank arm, the length of the crank arm and the mechanical advantage of the multiplying lever determining the stroke of the carriage in placing the work piece at a predetermined position.

9. In a machine of the character described the combination of a frame, a series of rolls mounted on the frame forming a seat to support an elongated work piece, means to drive the rolls, a stop adjacent one end of the seat to arrest the longitudinal movement of the work piece in a predetermined position, friction clutch means operatively interposed between the drive means and the rolls arranged to slip when the frictional load of the work piece is increased by its engagement with the stop to cause the rolls to cease rotation, a second seat supported on the frame parallel with the first seat and arranged to receive the positioned work piece from the first seat, means for clamping and machining the work piece while resting on the second seat, means for advancing the second seat longitudinally a predetermined distance to present the consecutive work pieces at a predetermined location for machining and for retracting them when finished, and means for transversely shifting the work pieces simultaneously from the retracted second seat, from the first seat to the retracted second seat, and depositing another work piece on the first seat.

10. A machine for accurately presenting an elongated work piece to a work performing station comprising, a support made up of a series of frames, a carriage slidable longitudinally on said frames and arranged to carry an elongated work piece, means to locate the end of the work piece at a predetermined position relative to the carriage and to subsequently place it thereon, a rotary crank, pitman means connecting the carriage to said crank, and means to rotate said crank through 180° to present the prepositioned work piece to a work performing station and to rotate the crank through another 180° to retract the work piece after work has been performed thereon.

11. In a conveyer table for shifting elongated cylindrical work pieces through a series of positions where work is performed thereon at selected positions, the combination of a plurality of spaced parallel frames the top surfaces of which slope in the same direction and are interrupted by a series of aligned work supporting seats, a plurality of levers each having a work receiving end and a work discharging end and disposed parallel with the frames, the top surfaces of the levers sloping to permit successive work pieces to roll laterally to consecutive seats when raised above the frames, aligned pivots positioned intermediate of the ends of the levers and near the work receiving ends, and means to apply a lifting force adjacent the work discharging ends of the levers to oscillate them in unison and permit the work pieces to shift to consecutive seats on the frames.

12. The structure of claim 11 characterized in that the work receiving ends of said levers are shaped to separate and convey the work pieces in turn to the first seat on the frames and to check the movement of the next consecutive work piece to be moved to said first seat.

13. The structure of claim 11 which also includes roll means at the location of one of said seats on the frames to move the work pieces longitudinally to a predetermined position preparatory to shifting the work piece laterally to a subsequent position where work is performed thereon.

ROBERT L. HIBBARD.